United States Patent Office 3,613,429
Patented Oct. 19, 1971

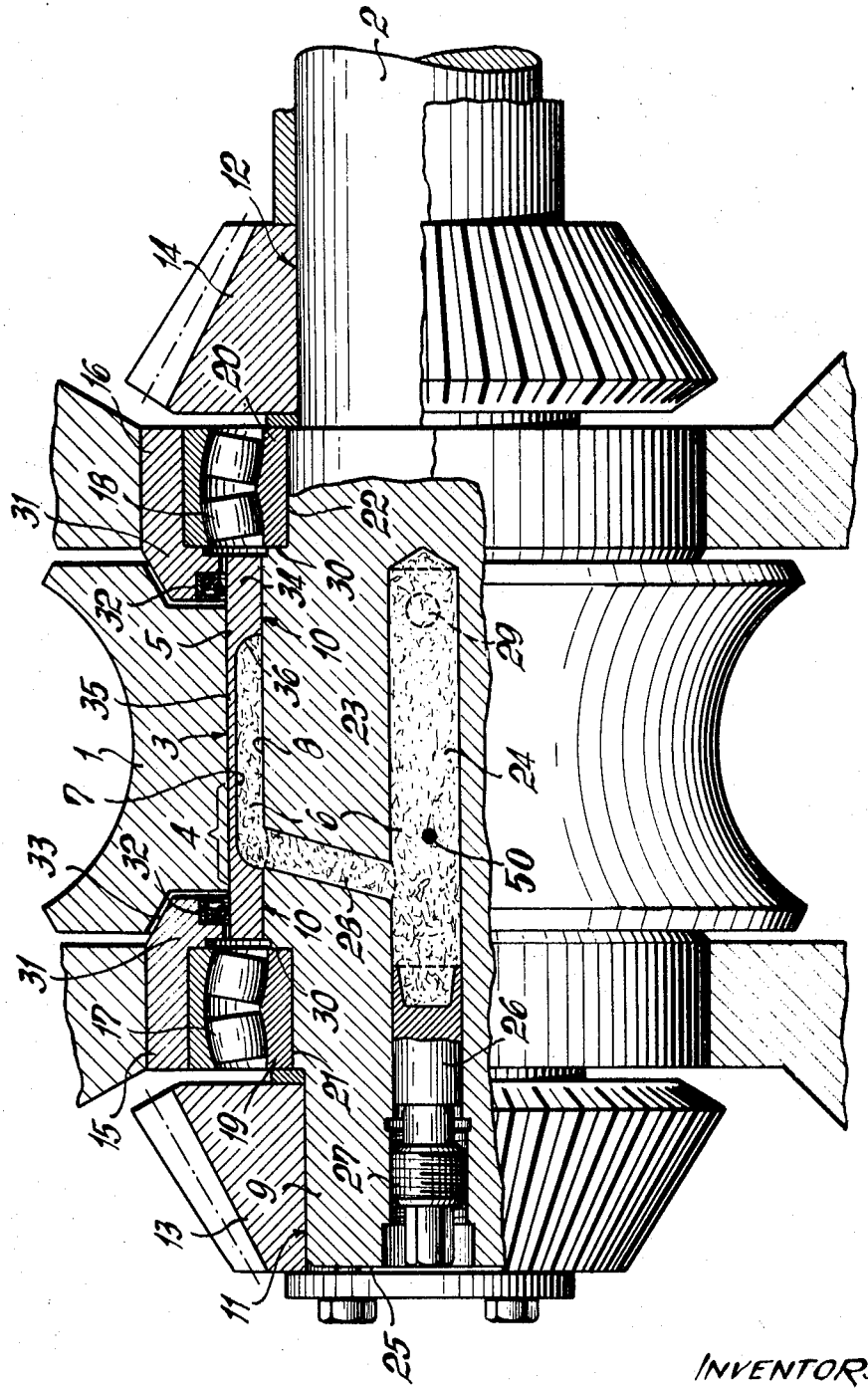

3,613,429
MEANS FOR SECURING OF ROLLING MILL ROLLS IN PARTICULAR THOSE IN STRETCH REDUCING MILLS
Karl-Heinz Schwarzenberg, Rumeln-Kaldenhausen, and Rolf Michel, Bochum-Hovel, Germany, assignors to Demag Aktiengesellschaft, Duisburg, Germany
Filed July 30, 1969, Ser. No. 846,078
Claims priority, application Germany, Aug. 1, 1968, P 17 52 902.1
Int. Cl. B21b 35/00
U.S. Cl. 72—249
8 Claims

ABSTRACT OF THE DISCLOSURE

The disclosure relates to a means of securing rolling mill rolls, in particular those in stretch reducing mills, consisting of a friction-type connection between the roll body centre bore and one or more ring(s) fitted to the drive shaft portion to transmit the driving torque.

---

Apart from clamping-type connections, prior art also provides for, for instance, connections by keying and also shrunk fit connections. The conditions for shrunk fit connections are given, for instance, in the case of an adequately thick hub to avoid exceeding the pre-calculated tension in the hub material. In the case of shrunk fit, the hub will be mainly subjected to the load of expanding force. For rolling mill rolls suitable rings are known to be inserted between roll body and driving shaft. However, such rings cannot be used for all types of rolling mill rolls because of the restricted space available. Connections of the shrunk fit type, as such, require most careful adapting to all operational requirements. The ground hollow shaft must be mated with a hub in heated condition, the oversize of which corresponds both to the heating up during operation and to the admissible initial tension because the latter will still be augmented by the actual load imposed by the rolling operation proper Such shrunk fit connections in the roll heads of stretch reducing mills present particular difficulty. The peculiarity of roll axles offset by 120° from each other in each case or of twin rolls driven in synchronism calls for distributory gearings to get the required torque from a common drive, which, in turn, makes it expedient, in the interests of speedy mounting and dismounting of roll heads, to provide for many separate units for in-line rolling phases. Prime costs will depend on the number of heads required as the result of the design of the individual head. Equally, the technical requirements are by no means secondary to the economic problems presented by such roll heads. The way in which the roll bearings cope with the roll load in conjunction with the driving torque to be transmitted constitutes the basis for an optimum compactness in construction so as to ensure that the static loads shall be kept within suitable limits. Arrangement of the pivot bearings would not, however, be directly affected unless additional space were needed at the same time for the other driving elements.

The design of the rolls as such is a factor very much in the foreground of similar considerations of the economic problem. The rolls must be of wear-resisting material to ensure optimum service life because the roll must be replaced either when the groove needs re-grinding or the roll body becomes totally unserviceable. In any case, a worn groove entails roll removal. It is also very much open to doubt whether such shrunk fit can be repeated time and again; be that as it may, the fact remains that only certain combinations of materials are suitable for connecting roll, shrinkage ring and driving shaft. Thus, for frequent roll changing, the shrunk fit proves disadvantageous.

It is already known from keying rolls to the driving shaft, that because of the notch effect encountered, the roll shaft or the roll proper must be more amply dimensioned. Because of the great numbers required and the high prime costs (for processing and materials), the rolls will constitute one of the major cost factors. The aim must be to cut down on these costs.

The object of the present invention is to devise an improvement for the method of securing the mill rolls, i.e. to find a solution more amenable to exchangeability of rolls and/or their attachment and detachment, whilst also doing away with the non-economic excessively large hubs.

The science of this invention now is that at least one of the rings forming the friction type connection is hollow and reacts to the pressure of a plastic but heat-resistant filler (filling compound) by bearing against the shaft portion as well as the roll body centre bore. This means an optimum lightness in construction of the roll which can closely approach a basic annular profile. Thus its weight will be reduced to the bare minimum and it will correspond particularly favourably to all the economic consideartions involved. Whereas a shrunk fit calls for specific precision, in this case the precision of fit becomes a secondary factor because a hollow ring subjected to tension is capable of expanding to such degree of closeness as to transmit an adequate torque through the friction type connection. A particular advantage afforded by the invention lies in the accurate control of expanding force so that, in addition, an optimum of initial tension can be built up to exactly the required extent to keep the initial tension together with the work load within the roll body lower than the permissible limit of loads imposed on the material. The material can, therefore, also be very highly utilized so that from this aspect also a specific economic advantage is presented. Whereas the compressive strain in the plastic filling compound, as such, is the source of the expansion effect and the resultant tightening onto the shaft portion, in this particular instance a friction type connection has been created which permits permanent shrinking on or forcing on of the hollow ring onto the drive shaft portion; and this goes further than previous solutions in that stripping the ring will not be carried out any longer during the useful life of the roll head.

A storage facility for plastic filler also being required, the invention further provides for storage space to become available by means of creating a suitable number of hollows formed at the combined circumference of the ring and driving shaft which can then be primed with filler from the interior of the shaft.

As a further improvement, the invention provides for a compression chamber within the drive shaft to be sealed with the aid of an adjustable piston. In practice, a higher pressure within the hollow ring can be achieved by suitably adjusting the piston setting which will result in an increased expansion effect. On the other hand, by allowing the piston to make its return stroke, an immediate pressure decrease can be obtained so as to facilitate roll withdrawal.

This invention also leads the way as regards preventing the plastic filler pressurized hollow ring and the bearings from influencing each other. This likewise involves preventing any thermal flow from the bearings to the plastic filler area. For this purpose, the invention provides that the drive shaft portion carrying the hollow ring is equipped at either end with stationary or revolving discs isolating it from the bearings in which the drive shaft is supported.

A sealing effect preventing leakage of lubricant from the bearings can be achieved by arranging the discs and the hollow ring(s) with the roll body to form a split labyrinth.

To enable the hollow ring to be frequently released and tightened without material fatigue therein, the invention further provides for the cross section of the hollow ring(s) to be so irregular as to ensure that even under high bending load of the expandable portion opposite the hollow space, the tension in the material shall be below the elastic limit.

According to disclosed prior art, one must proceed on the basis of the calculated tension in the roll material, i.e. incorporate more or less high safety margins as safeguards against damage caused by excessive stress-loading of the material. To also eliminate this objectionable feature, the invention moreover proposes to arrange a measuring device connected to the hollow portion of the ring to monitor the pressure within the plastic filler. This makes it possible to regulate the expansion effect of the hollow ring, considering at the same time the admissible tension in the material, to the extent necessary till the required torque to be transmitted has been reached.

The attached drawing shows a practical example of the invention in schematic representation; the elucidation is as follows:

The single figure shows an essentially axial section of a roll head, some of the parts being drawn in sight view.

Mill roll 1 is arranged with its axis of rotation 2 either parallel to a companion roll or in such manner that a roll centre line, not shown on the drawing, forms an angle of 120° to the adjacent roll, which means that 3 rolls are the assembly for rolling fully round shapes, such as required for the production of tubes or the making of similar products on stretch reducing mills. In either case, mill roll 1 features a roll body centre bore 3 of which the face 4 is formed by a circular cylinder shell. A hollow ring 5 is located within the bore 3 in close contact with the face 4, and it includes a hollow, or cavity 7, which is filled with a plastic heat-resisting filler 6 which is under pressure and fills hollow 7. In the embodiment shown the hollow ring 5 is equipped with shoulders 10 of equal diameter for guidance on shaft portion 8 of a driving shaft 9 and for isolating the filler 6. In the example shown, the hollow ring 5 with shoulders 10 is shrunk onto shaft portion 8 and remains permanently fixed in place during the entire service life of the roll head.

Drive shaft 9 has further end portions 11 and 12 on which bevel wheels 13 and 14, respectively, are arranged and which serve either to initiate driving torque for mill roll 1 or to transmit such torque to a further drive shaft 9 connected to a further mill roll 1, the latter not being shown on the drawing.

The roll head, which can thus accommodate several mill rolls 1, comprises bearing boxes 15 and 16 inside which the anti-friction bearings 17 and 18 are arranged. The inner rings 19 and 20 of bearings 17 and 18 are located on intermediate shaft portions 21 and 22 respectively, of driving shaft 9.

Drive shaft 9 incorporates in its interior 23 a compression chamber 24 extending to the left as shown in the drawing through to the front 25 of drive shaft 9. This compression chamber 24 is sealed by a piston 26 which can be shifted axially by rotation of a screw 27, which, if tightened, increases the pressure in compression chamber 24, or, if loosened, serves to decrease the pressure. When pressure is increased, filler 6 is advanced through radial bores 28 to one or several of the hollows 7 of hollow ring(s) 5 and fills these hollows 7 accordingly. When all hollows 7 and/or compression chambers 24 and/or bores 28 are filled for the first time, it may be expedient to let the air escape through a special bore 29.

Both ends 30 of drive shaft portion 8 carrying hollow ring(s) 5 are equipped with stationary or possibly rotating discs 31; these are shown in the example as parts of bearing boxes 15 and 16. Hence a special collar 32 serves in each instance as a fixed seal in a direction towards the shoulders 10 of hollow ring 5.

Discs 31 are so inserted in roll body 1 that an angular gap like a labyrinth is formed.

In the example, cross section 34 of hollow ring 5 features at 35 and 36 an irregular transition but, in addition, the expandable cross section portion 35 may be irregular in design, i.e. it may be vaulted or corrugated. This entails specific advantages both in respect to capacity for coping with particularly high stresses during operation as well as a number of advantages in the manufacturing process: for instance, suitably designed cross sections 34 of such hollow rings 5 can be hardened under particularly favourable conditions and with freedom from distortion.

The apparatus includes a device such as a sensor 50 for measuring the pressure in the compression chamber 24.

The following publications were considered: German patent specification 939,503, German patent specification 938,304.

We claim:

1. A rolling mill construction comprising a driving shaft having a bore therein for a heat resistant plastic filler, a ring surrounding said shaft in close contact therewith and having an intermediate hollow cavity for the plastic filler, a mill roll body having a central bore defined therein with a bore face in engagement with said ring, passage means for the passage of the plastic filler from the bore of said driving shaft to the hollow cavity of said ring, and means in said bore acting against said plastic filler to pressurize the filler and the cavity of said ring and to deform the ring into driving engagement between shaft and said mill roll body.

2. A rolling mill, according to claim 1, wherein said means acting against said filler includes a piston displacable in the bore of said shaft and wherein said ring includes at least one cavity opening into the bore of said ring and overlying said shaft, and including an end portion at each end of said cavity forming a seal with said shaft.

3. A rolling mill, according to claim 1, including a piston displacable in the bore of said shaft comprising said means acting against the plastic filler, and adjustment means connected to said piston for adjusting the position of said piston in the bore for varying the pressure on said plastic filler.

4. A rolling mill, according to claim 1, wherein the cavity of said ring member is opened against said shaft and a disc member on each side of said ring member for sealing this end of the ring member to prevent outflow of the plastic filler.

5. A rolling mill, according to claim 4, wherein said discs with said ring member and said roll body form a labyrinth seal.

6. A rolling mill according to claim 1, wherein said ring member includes an expandable portion between the cavity and the roll member forming an expandable portion which moves outwardly under increased pressure of said plastic filler to engage with said roll body and which is sufficiently flexible so that the material remains below its elastic limit.

7. A rolling mill, according to claim 1, including means in the bore of said driving shaft for measuring the pressure of the plastic filler material.

8. A rolling mill, according to claim 3, including ball bearing means on each side of said roll mill body for rotatably supporting said shaft, a level gear connected to said shaft outboard of said bearing means on each side, said shaft having an opening adjacent one side for the bore, said piston being accessible through the opening, and vent means for venting the bore of said shaft.

No references cited.

TRAVIS S. McGEHEE, Primary Examiner